Aug. 28, 1962 J. D. GOODELL ET AL 3,051,327
AUTOMATIC MANIPULATOR APPARATUS
Filed April 14, 1961 8 Sheets-Sheet 1
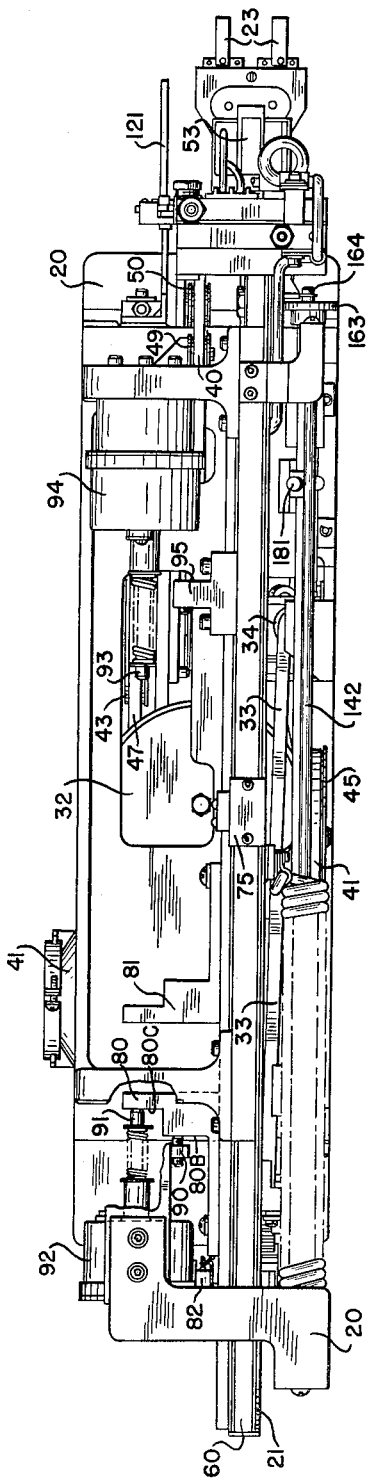
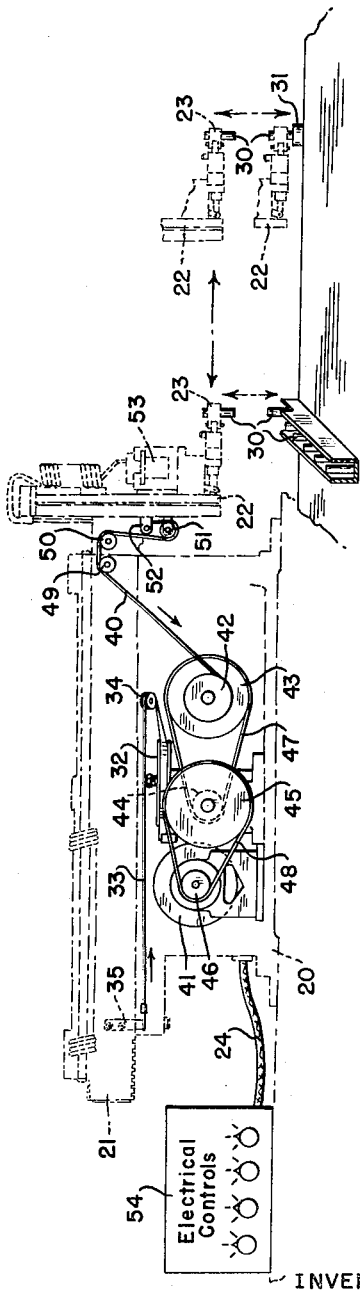
INVENTORS
JOHN D. GOODELL
TORSTEN N. TENGSATER
EDWIN F. SHELLEY
BY
ATTORNEYS

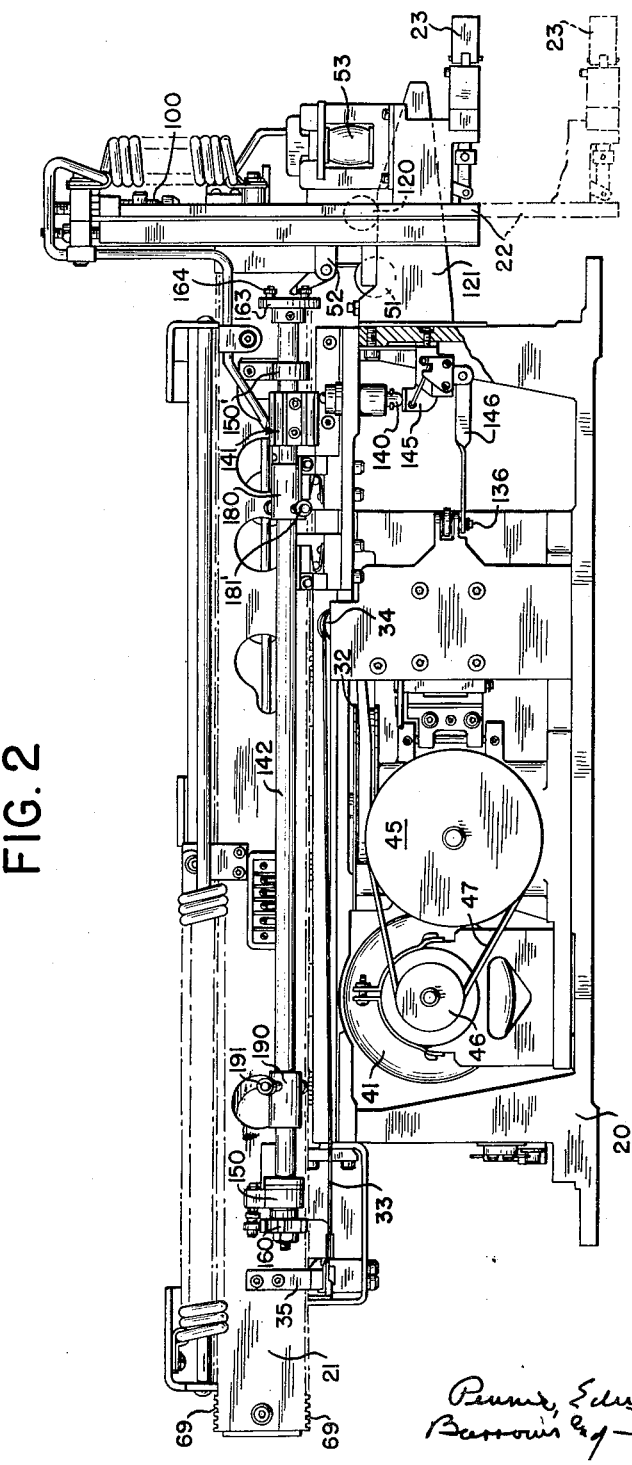

Aug. 28, 1962 　　J. D. GOODELL ET AL　　3,051,327
AUTOMATIC MANIPULATOR APPARATUS
Filed April 14, 1961　　　　　　　　　　　　　　8 Sheets-Sheet 3

INVENTORS
JOHN D. GOODELL
TORSTEN N. TENGSATER
EDWIN F. SHELLEY
BY
Pennie, Edmonds, Morton
Barrows & Taylor ATTORNEYS Aug. 28, 1962 J. D. GOODELL ET AL 3,051,327
AUTOMATIC MANIPULATOR APPARATUS
Filed April 14, 1961 8 Sheets-Sheet 4
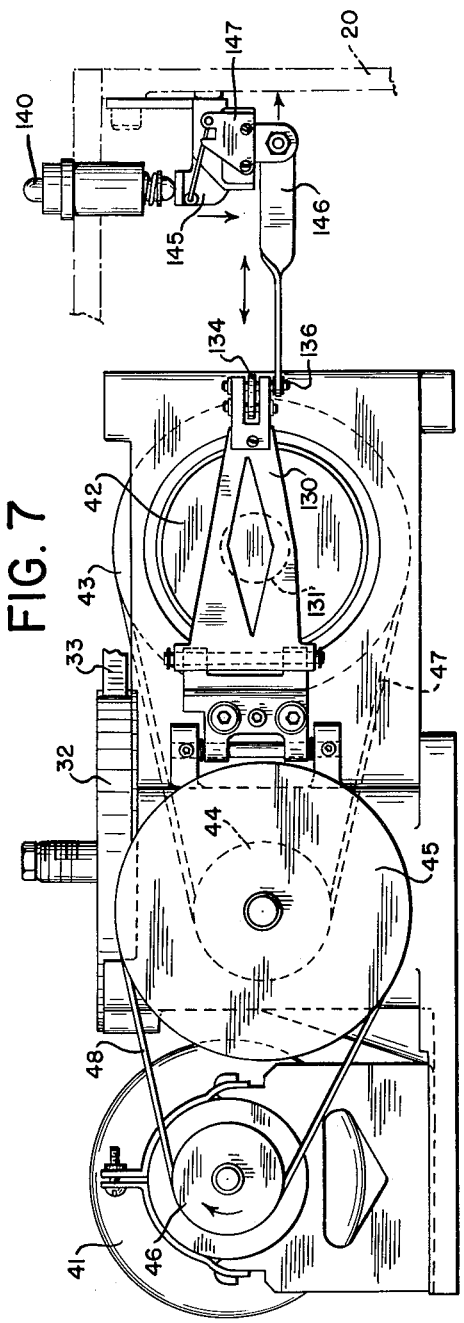
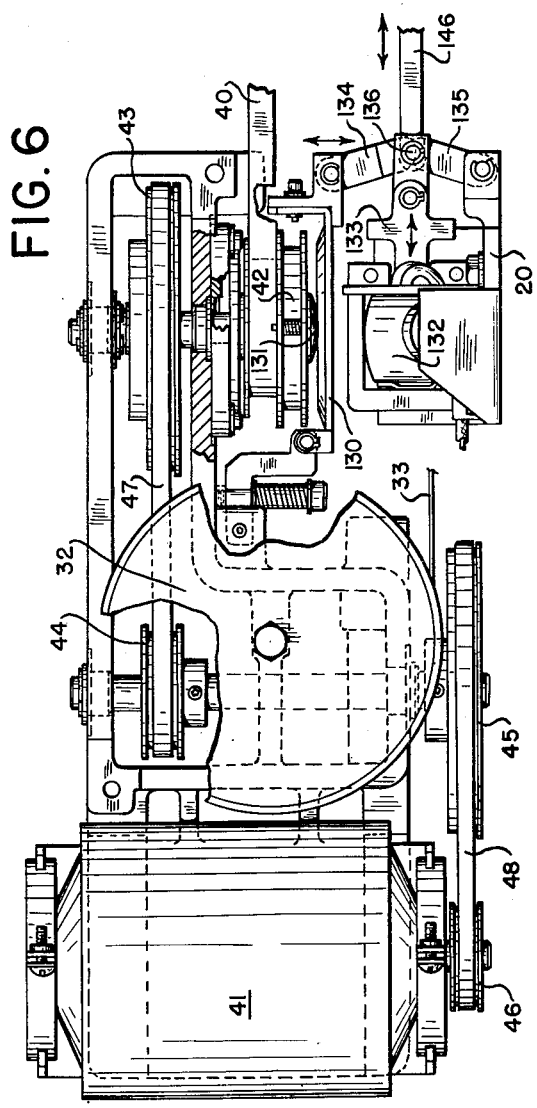
INVENTORS
JOHN D. GOODELL
TORSTEN N. TENGSATER
EDWIN F. SHELLEY
BY
ATTORNEYS

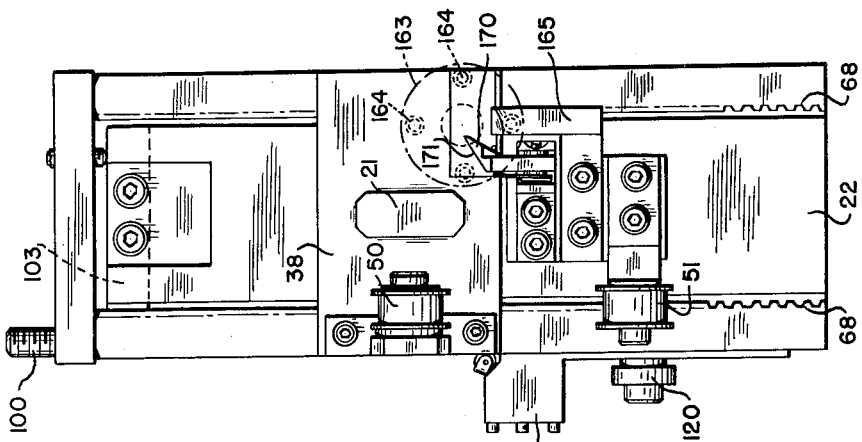
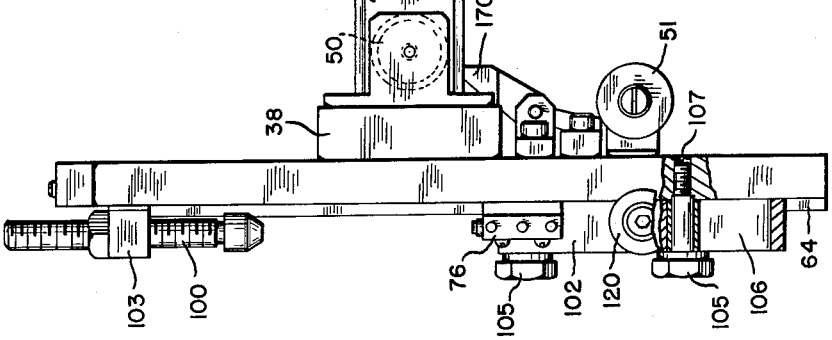
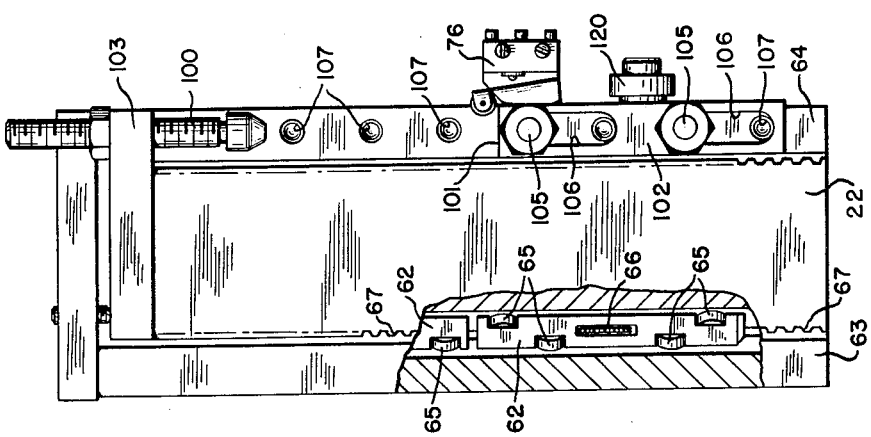

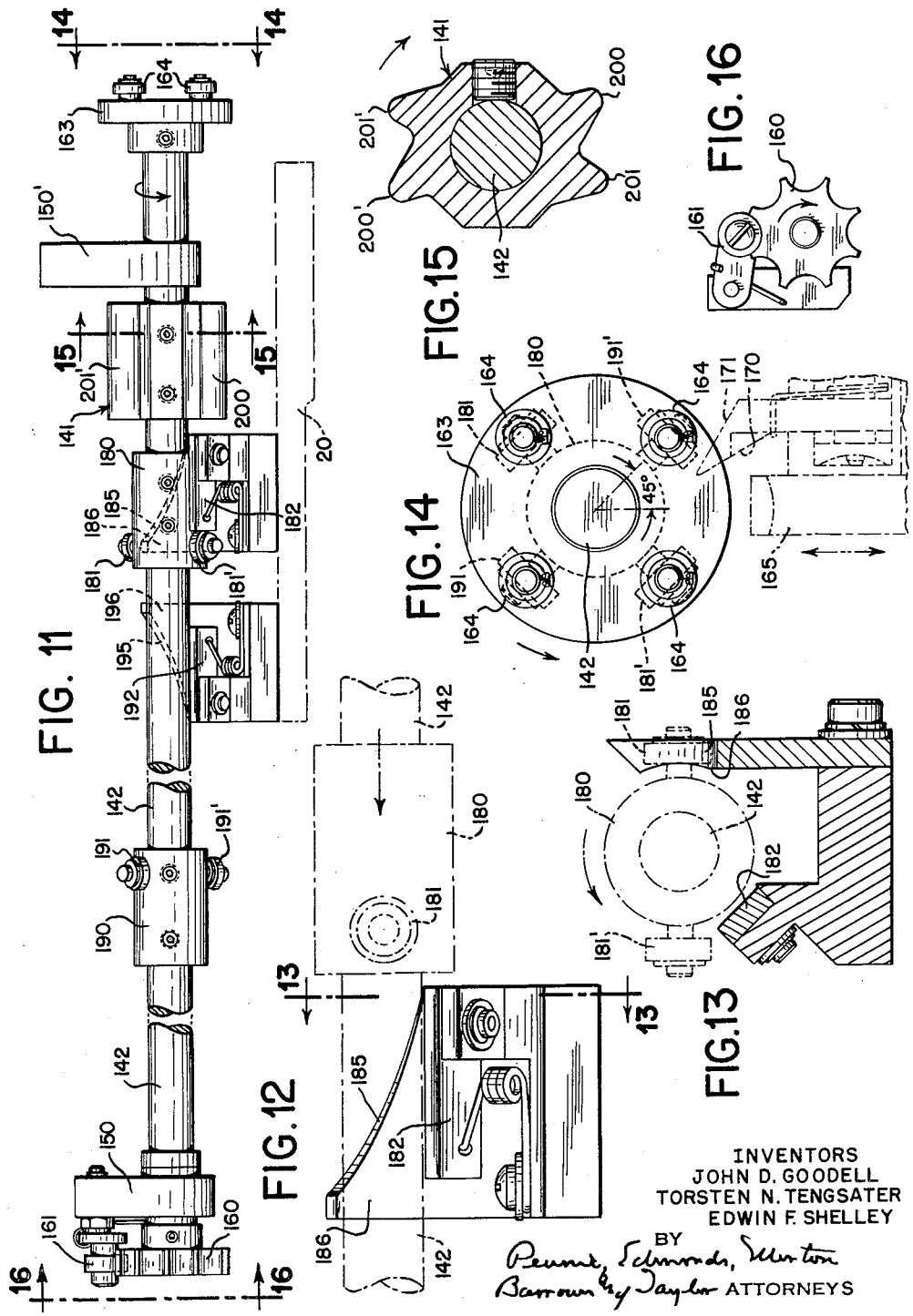

Aug. 28, 1962  J. D. GOODELL ET AL  3,051,327
AUTOMATIC MANIPULATOR APPARATUS
Filed April 14, 1961  8 Sheets-Sheet 7

INVENTORS
JOHN D. GOODELL
TORSTEN N. TENGSATER
EDWIN F. SHELLEY
BY
ATTORNEYS

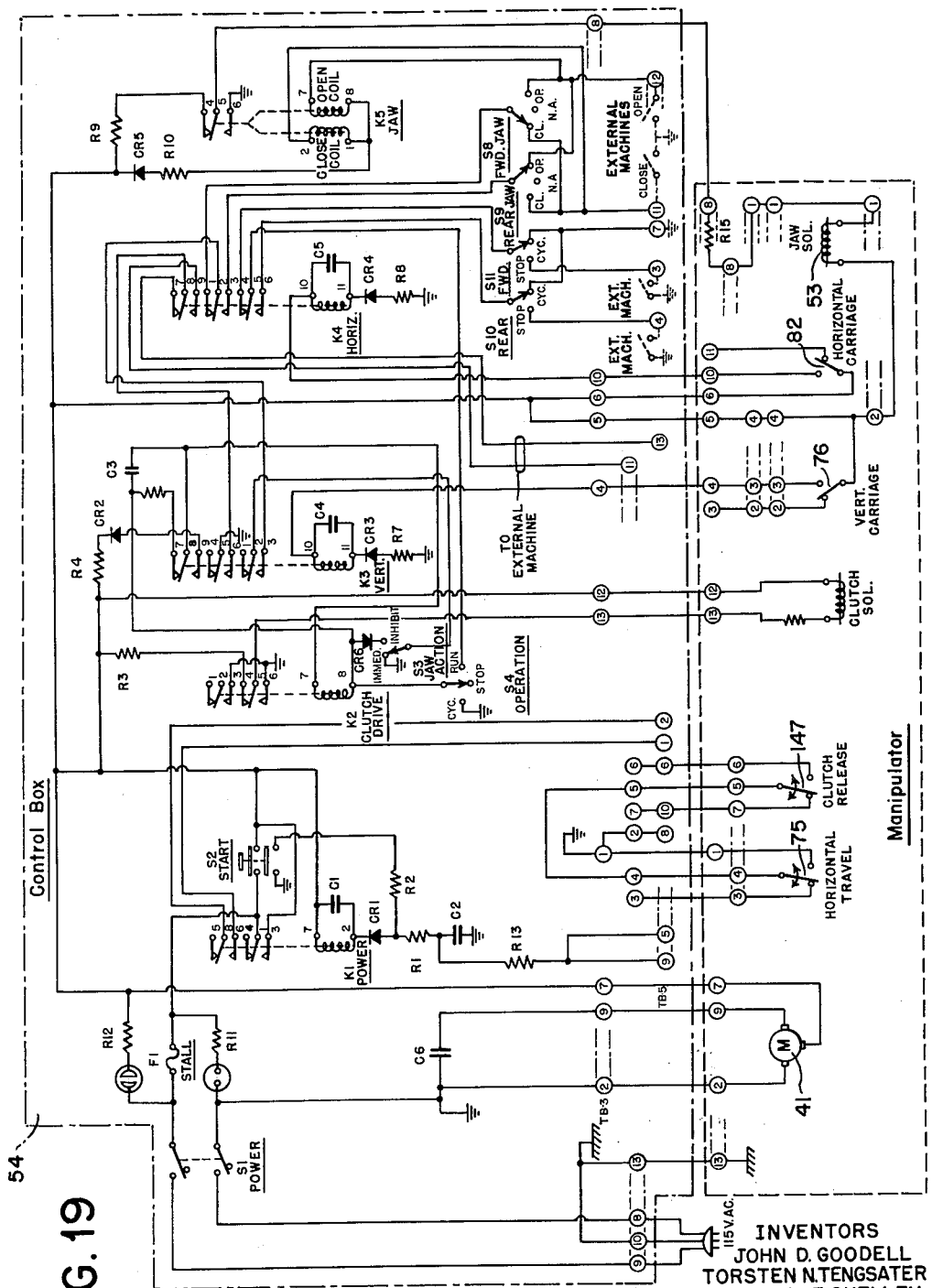

United States Patent Office 3,051,327
Patented Aug. 28, 1962

3,051,327
AUTOMATIC MANIPULATOR APPARATUS
John D. Goodell, Silver Spring, and Torsten N. Tengsater, Takoma Park, Md., and Edwin F. Shelley, New Rochelle, N.Y., assignors to U. S. Industries, Inc., New York, N.Y., a corporation of Delaware
Filed Apr. 14, 1961, Ser. No. 103,053
11 Claims. (Cl. 214—1)

The present invention relates to article handling machines generally and more particularly to an article manipulator device which is adapted to pick up preoriented individual articles at one station, and transport and put down the individual articles at a second station, automatically and repetitively.

While the apparatus of the present invention is adapted for a variety of applications, it is particularly useful in automatic assembly systems. In conventional automated assembly systems, it has been the practice to provide especially designed transfer devices to handle the specific components required in a given assembly operation. Such devices have been capable of only following a fixed path of operation in accordance with a fixed predetermined operating cycle.

The need has long existed for a versatile article manipulator which is capable of picking up an oriented component, transporting it in translation along a linear path and precisely placing it down at a desired receiving station automatically and repetitively, and which at the same time is capable of being adjusted and programmed to function (as slave or master) with a wide variety of other cooperating machines in an automatic assembly system.

It is a principal object of the present invention to provide a versatile and reliable automatic manipulator which is precise in its repetitive transfer positioning function and which may be readily adjusted to operate with a wide variety of differently shaped components.

A further object of the invention is to provide an automatic manipulator which requires substantially no personal supervision and which may be integrated into an automated assembly system as a component in an open-loop control circuit whereby the manipulator may either produce the necessary electrical control signals to control the sequence of assembly steps carried out by cooperating assembly machines and/or it may receive electrical control signals from the cooperating machines and function as a sequentially controlled slave device.

The manipulator provided by the invention includes a horizontally disposed carriage arm mounted on base supported rails which permit back and forth horizontal movement in translation. An elevator carriage is supported at one end of the horizontal carriage arm by rails which permit up and down translational movement of that carriage. A pair of grasping jaws are mounted on the elevator carriage and electromechanical means are provided for opening or closing these jaws during predetermined portions of the operating cycle. Electro-mechanically controlled drive means are provided to move the respective horizontal and vertical carriages in a coordinated sequence of motions such that the jaws are translationally moved upwardly, horizontally and downwardly with the jaws being opened then closed or closed then opened at the lower extremities of the vertical travel. One complete operating cycle includes a retrace in reverse direction of the aforementioned steps after which the jaws of the manipulator are ready to transfer another article.

In accordance with one featured aspect of the invention, a rotatable coordination control rod is provided to afford the desired mechanical program logic for sequentially coordinating the horizontal and vertical translational motions.

In the preferred embodiment of the invention, adjustable means are provided for controlling the respective path lengths of both the horizontal and the vertical translational motions so that the special requirements of a variety of different assembly operations may be readily accommodated.

In accordance with a further aspect of the invention, cam controlled stop means are provided for establishing a shorter vertical displacement of the jaws at one end of the horizontal carriage travel than at the opposite end thereof. This feature is particularly useful in assembly operations where oriented components are supplied at one elevation level and must be delivered to an assembly receiving station at a different level.

Other objects and features of the invention will be apparent from the following more particular description of a preferred embodiment of the invention as illustrated in the accompanying drawings.

In the drawings:

FIG. 1 is a fragmentary elevational view illustrating the operational functions of the manipulator provided by the invention;

FIG. 2 is a full elevational view of an automatic manipulator constructed in accordance with the invention;

FIG. 3 is a top plan view of the manipulator shown in FIG. 2;

FIGS. 6 and 7 are fragmentary plan and elevation views respectively showing the electro-mechanical clutch control mechanisms for the manipulator draw-tape drive system;

FIGS. 8, 9 and 10 are front, side and rear elevation views of the vertical elevator carriage assembly with the jaw mechanism removed;

FIG. 11 is a perspective view of the coordination control rod assembly for the manipulator shown in FIG. 2;

FIGS. 12 and 13 are enlarged side and end elevation views of the horizontal carriage latch and cam assembly shown in FIG. 11;

FIG. 14 is a front view of the vertical carriage locking assembly shown in FIG. 11;

FIG. 15 is a sectional view of the clutch release cam shown in FIG. 11;

FIG. 16 is an end view of the indexing mechanism for the coordination control rod shown in FIG. 11;

FIG. 19 is a schematic diagram showing electrical control circuits for the manipulator.

Figure 5:
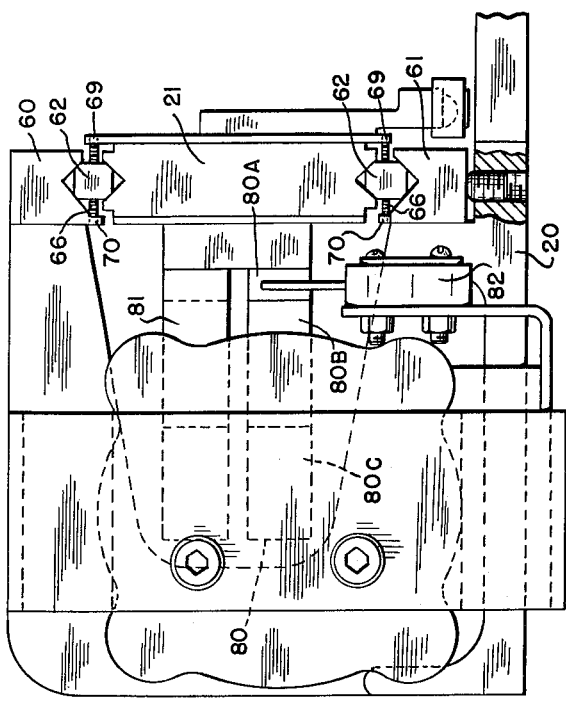
FIG. 5 is a partial rear elevation view of the manipulator as shown in FIG. 2.

The automatic manipulator provided by the invention, as shown partially in phantom view in FIG. 1, includes a main base 20 supporting a carriage arm 21 movable horizontally in translation, an elevator carriage arm 22 supported for movement in vertical translation at the forward end of carriage arm 21, and grasping jaws 23 supported at the lower end of the elevator carriage arm 22. As illustrated in the drawing, the manipulator is adapted to grasp an oriented assembly component 30 when the jaws are located at the "in" and "down" position, then lift the component vertically in translation, transport the component horizontally in translation to an extended "out" position, lower the jaws vertically and release the component at an assembly receiving station 31.

In accordance with a preferred embodiment of the invention, transport drive for the horizontal carriage arm and the vertical elevator carriage is provided by a pair of opposing draw-tape drive mechanisms. The horizontal carriage arm is driven from the "in" position to the "out" position (during the proper portion of the operating cycle) by spring motor 32, the latter being operatively coupled to carriage arm 21 via flexible draw-tape 33 which extends around idler pulley 34 and is attached to arm 21 with bracket 35. Thus draw-tape 33 is continuously under tension force supplied by spring motor 32 and unless the carriage is locked or unless a greater counter opposing drive force is applied to the carriage arm via draw-tape 40, the arm will be extended to the "out" position and remain there.

Drive power to lift the elevator carriage and to return the horizontal carriage from the "out" to the "in" position is supplied by electric motor 41 which is coupled to draw-tape 40 through clutch 42 and a double-reduction pulley system including pulleys 43, 44, 45 and 46, and belts 47 and 48. Tape 40 extends over idler pulley 49 which is supported by the base, over idler pulley 50 supported by the horizontal carriage arm 21, under idler pulley 51 supported by the vertical elevator carriage 22, and is attached at its far end to the horizontal carriage arm by bracket 52. When clutch 42 is opened and neither carriage is locked in position, the gravity operated elevator carriage will drop to the lower level and the horizontal carriage arm will be moved to the "out" position by spring motor 32 as explained above. The elevator carriage is lifted by locking the horizontal carriage at the "out" position and applying drive tension to draw-tape 40 (in direction of arrow) by closing clutch 42. When the elevator carriage reaches the "up" position, it is locked in position and the horizontal carriage arm is unlocked. The drive force applied by tape 40 is sufficient to overcome the opposing force supplied by tape 33 and hence the carriage arm is driven to the "in" position where it is momentarily locked. Power is then removed from tape 40 and the elevator carriage is unlocked and allowed to fall to the lower position. Opening and closing of the grasping jaws is effected by spring loaded solenoid 53. Electrical control circuits for the automatic manipulator are shown at 54 with innerconnections being provided by cable 24. These circuits and the cooperating mechanical coordination control mechanisms will be explained in detail in connection with the descriptions of the various drawings which follow.

The mechanical details of a preferred embodiment of the automatic manipulator provided by the invention are shown in FIGS. 2–5. The horizontal carriage 21 is supported for free movement in translation by a pair of grooved rails 60 and 61 which are in turn supported by base 20. A plurality of truck members 62 carrying roller bearings are mounted between the cooperating V-grooves in carriage 21 and the support rails as shown. The same truck members 62 are mounted between cooperating V-grooves in elevator carriage 22 and vertical support rails 63 and 64 (see FIG. 8). The truck members include roller elements 65 and toothed drive wheel 66, the teeth of which are adapted to engage with the cooperating serrations 67 and 68 on the elevator carriage and the vertical rails respectively. In the case of the horizontal carriage, the corresponding serrations are shown at 69 and 70.

The operating stroke length for the horizontal carriage is established for the "in" position by stop member 80 and for the "out" position by stop member 81, both members being adjustably fixed to track surfaces on the horizontal carriage. The first riser surface 80A is arranged to actuate microswitch 82, which forms part of the electrical control circuit, and the second riser surface 80B acts against the fixed stop 90 mounted on the main base. Riser surface 80C acts against pushrod 90 of dashpot 92 and serves to slow the carriage travel before 80B contacts stop 90. The operation of carriage stop 81 against rod 93 of forward dashpot 94 and fixed base stop 95 is the same as that for the stop 80 and will not be further described.

The length of downward travel for the elevator carriage (and jaws) is established by contact between the lower end surface of threaded member 100, supported on the elevator carriage by bracket 103, and the upper surface 101 of slide stop 102. (See FIGS. 4, 8, 9 and 10.) Stop 102 is slidably affixed to rail 64 by bolts 105 which extend through elongated slots 106 into threaded holes 107 in rail 64. Rails 63 and 64 are rigidly affixed to the horizontal carriage by bracket 38. A plurality of mounting holes 107 are provided so that the slide stop 102 may be mounted on rail 64 at several different levels to afford different vertical stroke lengths. Fine adjustment of the vertical stroke length is effected by adjusting screw member 100. Since the slide stop 102 normally rests at the lowest position with respect to the supporting bolts 105 as shown, the above described adjustments determine the maximum downward travel of the elevator carriage for both the "in" and "out" positions of the horizontal carriage. Microswitch 76 is supported on slide stop 102 and is arranged to be actuated at the "down" position of the vertical carriage by the lower tip of 100.

In accordance with one featured aspect of the invention, a cam follower 120 is mounted on the side of slide stop 102 to provide a convenient means for lifting the slide stop at either the "in" position or the "out" position for the horizontal carriage in order to shorten the downward stroke of the jaws. In the particular embodiment shown in the drawings (see FIGS. 2 and 4), blade cam 121, mounted on base 20 by clamp member 122, is provided to ride under follower 120 and lift slide stop 102 by the desired amount at the "in" position and accordingly shorten the down stroke at the "in" position with respect to the selected down stroke for the "out" position. Fine adjustment of the vertical down stroke at the "in" position is effected by adjusting screw member 125.

It will be understood that an external post may be provided to support cam 121 at the "out" position so that the slide stop will be lifted by the desired amount to shorten the "out" down stroke with respect to the "in" down stroke. Where differential control of the down stroke is not required, cam 121 may be removed.

The electrical drive system, which has generally been described in connection with FIG. 1, is shown in greater detail in FIGS. 6 and 7. Drive power from belt 47 is coupled to draw-tape 40 when friction clutch 42 is engaged by movement of pivoted arm 130 inwardly against spring-loaded clutch member 131. In the preferred embodiment, clutch arm 130 is moved inwardly by momentarily electrically energizing solenoid 132. The resulting inward movement of armature 133 causes linkage arms 134 and 135 to move arm 130 inwardly to the clutch engagement position. In so doing, pivot pin 136 is moved to the opposite side of the center position and the clutch 42 is locked in the engaged position. The clutch remains engaged until such time as pin 140 is depressed by the rotation of the clutch release cam 141 which is mounted on the coordination control rod 142 (see FIGS. 2 and 11). Downward depression of 140 against pivoted arm 145 causes cross-arm 146 to move forward and disengage the friction clutch. At the same time microswitch 147 in the electrical control circuit is actuated. Operation of this switch and the other electrical control circuits will be described in connection with FIG. 19.

One of the unique features of the present invention is the coordination control rod 142 which provides the necessary mechanical logic to coordinate and maintain the desired sequence of operating motions. This rod performs a number of important operating functions for the manipulator including lock-up and release of the horizontal carriage arm at both the "in" and "out" positions, lock-up and release of the vertical carriage at both the "in" and "out" positions of the horizontal carriage, and release of the draw-tape drive clutch at the "in" position. The rod 142 is rotatably supported on the base frame by bearings 150 and 150' (see FIG. 11) and carries an indexing wheel 160 at one end which is adapted to operate cooperatively with spring-loaded pawl arm 161 to keep the rod from rotating during certain intervals of the operating cycle. In the illustrated preferred embodiment, the program rod is intermittently advanced by 45° increments with a complete operating cycle producing 180° of rotation. The control rod is rotated 45° in the counterclockwise direction (as shown in FIG. 11) each time the translational motion of the jaw mechanism is to be switched from vertical to horizontal or horizontal to vertical. Each 45° increment of rotation is utilized to lock-up or release one of the carriages or to release the drive clutch.

Referring to FIG. 11, it will be seen that the control rod carries a collar 163 affixed to the forward end thereof which is adapted to either drive the rod in rotation during certain portions of the operating cycle, or be rotated by the rod during other portions of the operating cycle. Collar 163 carries four equally spaced (90°) lock pins 164 (see FIG. 14) which function cooperatively with a locking tongue 165 mounted on the vertical elevator carriage (see FIG. 10) to lock that carriage in the "up" position when the horizontal carriage is in motion. This locking operation is effected when the collar 163 is oriented as shown in FIG. 10 with one of the locking pins located in the "down" position and engaged under the locking tongue 165 as illustrated. A subsequent rotational advance of 45° unlocks the vertical elevator carriage permitting it to drop to the "down" position established by the setting of stops 100 and 102 as described above.

As shown in FIGS. 11 and 14, the rod 142 is angularly oriented so that lowermost locking pin 164 is displaced 45° from the bottom position (vertical carriage locking position). As indicated, this rod orientation is proper for "down" position of the jaws. When the vertical elevator carriage is subsequently lifted from the "down" position, the cam surface 171 of spring-loaded pawl arm 170, mounted on the back side of the elevator carriage (see FIG. 10), contacts the locking pin 164 located 45° c.c.w. from the bottom locking position (see FIG. 14), and advances the rod rotation another 45° thereby locking tongue 165 over the following locking pin 164.

As indicated above, the control rod 142 functions to maintain the proper sequence of motions for the respective horizontal and vertical carriages in order to effect the desired translational movement of the grasping jaws. The mechanisms provided to effect the desired coordination include an "in" position collar 180 affixed to the rod 142 and having follower pins 181 and 181', and an "out" position collar 190 having follower pins 191 and 191'. The "in" position pins, disposed 180° apart, are adapted to function both as cam followers and as locking pins to momentarily lock the horizontal carriage in the "in" position of travel. The desired locking operation is effected by movement of pin 181' behind spring-loaded latch bar 182 which is supported by base 20. When the horizontal carriage is moved from the "out" position towards the "in" position, the vertical carriage is locked up and pins 181 and 181' are aligned in the horizontal plane as illustrated in FIG. 12. As the carriage nears the "in" position (defined by the selected setting of the carriage stops), follower pin 181 engages the surface 185 of cam 186 and is forced to rotate 45° c.c.w. (as viewed from front) during the course of travel across the cam face. The latter rotation forces pin 181' to lock behind 182 and at the same time unlocks the vertical carriage by moving pin 164 out from under tongue 165 permitting the jaws to drop to the "down" position as defined by the settings of 100 and 102.

The rotational and locking operations of the "out" position follower pins 191 and 191' against the surface 195 of cam 196 and with latch bar 192 is the same as that of the "in" position follower pins except that the 45° rotation of the control rod 142 is produced by horizontal travel towards the "out" stop. It should be noted that pins 191 and 191' are also displaced 180° apart (on collar 190) but in a plane 90° removed from pins 181 and 181'. The relative orientation of the respective locking pins is best illustrated in FIG. 14. It is apparent upon reflection that when a pair of locking pins 164 are vertically aligned, the vertical carriage is locked in the "up" position and the horizontal carriage is in an unlocked condition and accordingly free to move either in or out depending upon the phase of the operating cycle. Furthermore, it will be understood that whenever pins 181, 181' or 191, 191' are not aligned in either the vertical or horizontal planes, the horizontal carriage will be locked either in the "in" or "out" position and the vertical carriage will be released to the "down" position.

In normal operation, the overall length of the horizontal stroke is adjusted as required by setting stops 80 and 81 to provide the desired amount of horizontal carriage travel. Collars 180 and 190 are then positioned on rod 142 so that the horizontal carriage is properly latched at both the "in" and "out" positions.

An additional important coordination function performed by control rod 142 is that of releasing the friction clutch which, when engaged, applied drive power to draw-tape 40. Since two opposing draw-tape drives are provided to drive the manipulator (one passive and one active), it is necessary to provide means which will cyclically engage and disengage the coupling clutch for the active drive at the appropriate times in the operating cycle. As indicated above, solenoid 132 is provided to engage the clutch when electrically energized with a voltage pulse, and clutch release cam 141, affixed to control rod 142, is adapted to periodically depress pin 140 and release the clutch. As illustrated in FIG. 15, cam 141 has two sets of lips 200, 200' and 201, 201' which function to depress pin 140 and release clutch 42. Cam lips 201 and 201' are arranged to release the clutch when the horizontal carriage is first locked in the "in" position and the vertical carriage is unlocked and ready to drop. Cam lips 200 and 200' are arranged to unlock the clutch after the vertical carriage has been lifted from the "in" and "down" position and locked at the "in" and "up" position. This last action takes place at the same time that the horizontal carriage is unlocked and freed to be driven to the "out" position by the spring motor 32 and draw-tape 33. The corresponding cam lips are displaced 180° since they are only required to function once during each operating cycle. The adjacent cam lips (i.e., 201, 200) are separated by 45° as shown since the clutch must be released just before the jaws drop on the "in" position and right after they have been lifted.

Figure 4:
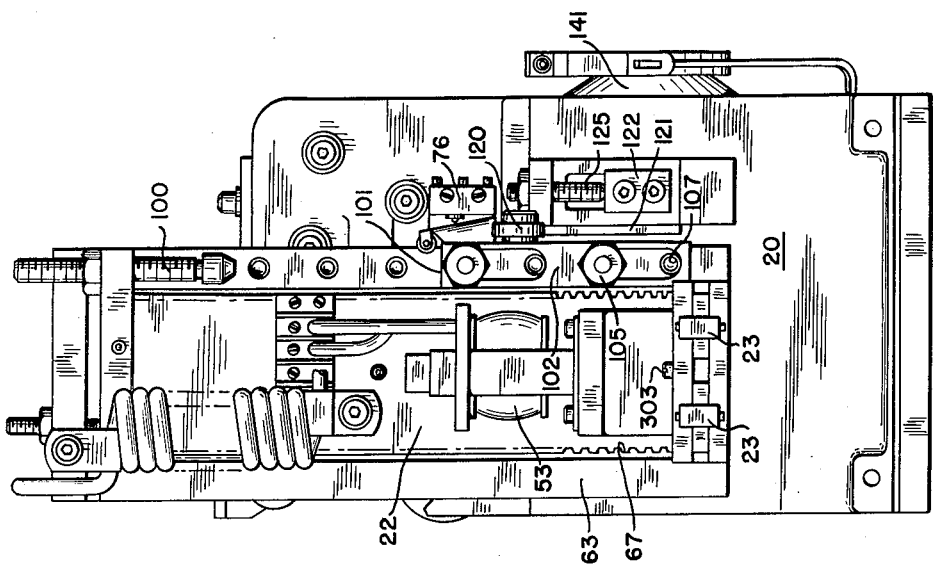
FIG. 4 is an enlarged front elevation view of the manipulator shown in FIG. 2.
Figure 18:
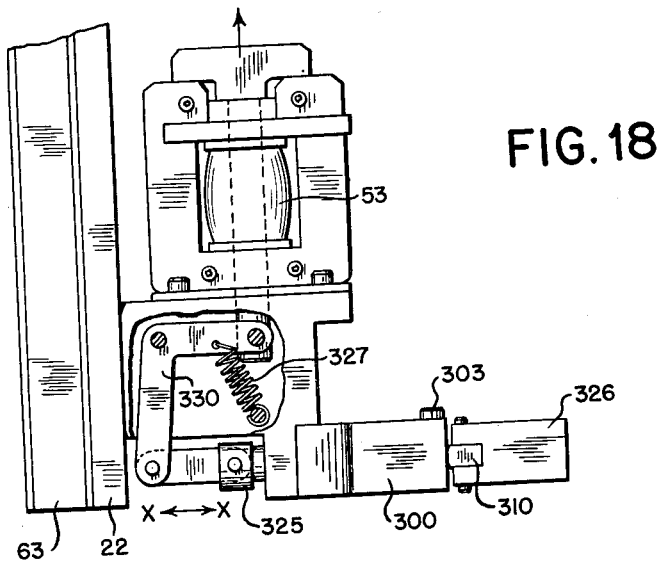
FIG. 18 is a side view of the solenoid actuating mechanism for the grasping jaws shown in FIG. 17.
Figure 17:
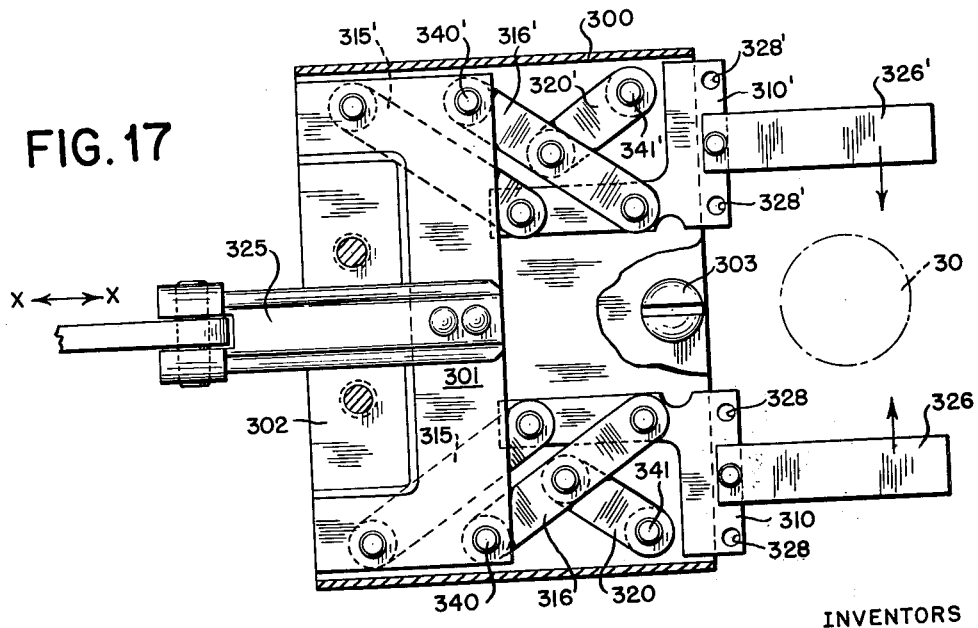
FIG. 17 is a plan view showing a preferred form of self-locking grasping jaws for the manipulator shown in FIGS. 2, 3 and 4.

FIGS. 17 and 18 show a preferred embodiment of a solenoid actuated self-locking jaw mechanism for the automatic manipulator as shown in FIGS. 2–4. The mechanism includes a housing 300 containing a plate 301 slidable in the direction X—X between rear stop plate 302 and forward stop pin 303, and jaw holders 310 and 310'. Linking the plate 301 with holders 310 and 311 are pantograph members 315, 316 and 315', 316'. Members 315, and 316, are rotatably affixed at one end to plate 301, and at the other end to 310. In like manner members 315' and 316' are connected between 301 and 310'. Pivot arms 320 and 320' are rotatably affixed at one end to housing 300 and at the other end to members 316 and 316', respectively. Drive rod 325 is rigidly affixed to plate 301 and jaw members 326, 326' are removably attached to holders 310 and 310', respectively.

A plurality of holes 328, 328' are provided in each holder to facilitate mounting of the jaw members at a desired spacing to accommodate different sized articles. When solenoid 53 is energized, the lower arm of spring-loaded bell-crank 330 causes drive rod 325 to move outwardly from 22 thereby causing jaw members 326, 326' to close together in a direction which is normal to the direction of travel for 325. When the solenoid is de-energized, spring 327 acting downwardly on the upper arm of 330 causes the jaws to open.

The locking feature of the jaw mechanism comes into play when plate 301 is moved forward to the point where members 316, 316' are aligned parallel with pivot arms 320, 320'. Any additional forward motion of the plate 301 causes pivot pin 340 to move forward of pivot pin 341 so that any forces tending to move 326, 326' away from each other will tend to drive plate 301 forward against stop pin 303. Pin 303 thereby affords a positive lock against retrograde motion of the jaw members. The jaw members are always initially positioned (for a given part size) on 310, 310' so as to assure that the final closed position is always reached with plate 301 in its forwardmost locked position.

One of the featured aspects of the present invention resides in the fact that the manipulator including the electrical control circuits can be included as a component in an open loop programming system for a combination of machines forming an automated assembly system. In such a role, the manipulator apparatus may be directed by electrical voltage pulses from external devices, or the manipulator control circuits may be utilized to present supervisory control signals to cooperating external machines during selected portions of the operating cycle.

A particular embodiment of a relatively simple and flexible relay type control circuit is shown in FIG. 19 of the drawings. The principal function of the control circuit is to provide voltage pulses in proper time sequence to the clutch actuating solenoid 132 and the jaw actuating solenoid 53. Function selector switches, relay switches and the like are located in control box 54 and are interconnected with the various position sensing microswitches, solenoids, etc. in the manipulator by cable 24. The several positions sensing microswitches mounted on the manipulator and shown in the various mechanical illustrations include clutch release-microswitch 147, horizontal travel microswitch 75, vertical carriage microswitch 76 and horizontal carriage microswitch 82 ("in" position).

A.-C. power for the manipulator control circuits is initially applied between switch arm 1 of power control relay K1 and ground by closing switch S1 to the "on" position. Power relay K1 is actuated by pressing start button S2. The relay is self-latching via contacts 1 and 2 as shown, and when closed connects the positive side of the A.-C. line to all circuit points within the control box and to the motor 41, solenoids 132 and 53, and microswitches 75, 147, 76 and 82 in the manipulator.

Power relay K1, though self-latching as shown, will unlatch itself within a predetermined time period (e.g., 4 seconds) unless the lower end of R13 is periodically switched to ground. This desired timing function is obtained by a differentiating network including CR1, R1, C2 and the coil of K1. The holding current for relay K1 is the charging current of the network and the time constant of the network is chosen so that the current decays to dropout value for the relay in the desired time interval, e.g., 4 seconds). Periodic discharging of C2 returns the capacitor to an initial uncharged state allowing the relay to remain latched up for another 4-second time interval. This network serves as a safety device by disconnecting power from the control circuits in case of machine malfunction. Circuit connections for effecting the periodic discharging will be described below. Where desired, the safety feature may be disabled by connecting terminals 8 and 9 of terminal board TB5 together.

As indicated in the foregoing description of the various drawings, a plurality of position sensing microswitches are provided on the manipulator to sense the operating positions of the respective horizontal and vertical carriages, as well as the clutch release arm. Switch 82 located on the base of the manipulator is actuated when the horizontal carriage is moved to the "in" position and the clutch release switch 147 is actuated when clutch release cam 141 depresses pin 140 and thereby mechanically releases drive clutch 42. The vertical carriage switch 76 is actuated when the vertical carriage reaches the "down" position. Switch 75 is mounted on the base and may be located anywhere between the "in" and "out" horizontal stops to be actuated by movement of the horizontal carriage. This switch may be used, for example, to develop timing control signals (for external use) during predetermined portions of the horizontal carriage travel.

The control circuit as shown may be operatively adjusted to provide several different cycles of manipulator operation. For purposes of explanation, one machine cycle will be defined as motion of the manipulator between the fully retracted (carriage horizontally "in" and jaws vertically "down") and the fully extended (carriage horizontally "out" and head vertically "down") positions, including one complete retraction and one complete extension. A half cycle of operation includes either a complete extension from the fully retracted position or a complete retraction from the fully extended position. In normal operation, the cycling (half or full cycle) must commence from either the fully retracted ("in") or the fully extended ("out") position.

The manipulator may be caused to operate on a repeat cycle or self-cycling operation by switching both the "forward" program switch S11 and the "rear" program switch S10 to the "cycle" positions and the "operation" switch S4 to the "run" position. Switches S10 and S11 through switch arm 5 of horizontal relay K2 and "operation" switch S4 provide A.-C. circuit ground to the clutch drive relay K2. Relay K2 is thereby readied for operation and will in fact be energized when vertical relay K3 is actuated by the operation of vertical carriage switch 76. Closure of K2 is delayed after the closing of K3 due to the charging time constant of capacitor C3 through CR2 and R4. The operation of relay K2 provides a ground return for the clutch solenoid through switch arm 5 as shown. Thus it will be seen that the application of drive power to the draw-tape 40 is slightly delayed with respect to the arrival of the vertical carriage in the "down" position. Assuming the vertical carriage is in the "in" and "down" position, upon the closing of the drive clutch, the vertical carriage is lifted to the "up" position whereupon the program rod 142 is rotated 45°, the vertical carriage is locked up on pin 164, and the clutch is mechanically disengaged by the rotation of cam 141 against pin 140. The horizontal carriage is unlocked and is driven to the forward position by the action of spring motor 32 and draw-tape 33. When the horizontal carriage reaches the forward or extended position, control rod 142 is again rotated 45° by follower pin 191 contacting cam surface 195. The horizontal carriage is thereby locked in the "out" position, and the vertical carriage is unlocked and dropped to the "down" position. Horizontal relay K4 is not actuated in the forward position, however the ground return is nevertheless completed through S4, S11 and the normally closed contacts 4 and 5 of K4 as shown. Thus clutch solenoid 132 is again energized as described above when vertical carriage switch 76 is closed, the vertical carriage is elevated to the "up" position, control rod 142 is rotated 45°, the vertical carriage is locked "up" and the horizontal carriage is unlocked (191 rotated from behind 192). The carriage is then pulled back to the "in" position where it is locked up by a 45° rotation of 181 behind latch bar 182. At the same time the rotation of cam 141 releases the clutch and unlocks the vertical carriage permitting it to return to the "down" position. Unless power is removed or unless S10 or S11 is switched to "stop" position, the manipulator will continue to recycle as described above.

In accordance with the teachings of the invention, the grasping jaws may be programmed to close (pick-up) or open (put-down) during various time intervals of the operating cycle. Ordinarily the jaws will be programmed to close at one end of the operating cycle (e.g., the "in" and "down" position) and open at the other end (the "out" and "down" position). Operation of the grasping jaws is controlled by relay K5 which provides A.-C. circuit ground to one terminal of jaw solenoid 53 via contacts 5 and 6 as shown. The other terminal is connected directly to the +A.-C. line. Programming of the jaws to "open," "close" or remain unchanged ("no action") is effected by pre-setting switches S8 (forward jaw action) and S9 (rear jaw action) to the desired function. Relay K5 is a double coiled magnetic latching type relay. Momentary activation of the closing coil closes the normally open contacts 5 and 6 and the relay holds in this condition until the opening coil is energized. The relay K5 is a flip-flop device and the latching feature assures that the jaw condition assumed upon initially starting the machine is that condition called for according to the last activation of jaw relay K5. Selection of jaws "open" (S8 or S9) provides ground to the closing coil of K5. Setting of S8 or S9 to "no action" removes ground from both coils. This selection is made where it is desired to have jaw action initiated and controlled through switches operated by external machines. These external switches (dotted) are connected to TB5 terminals 11 and 12 as indicated.

Internally programmed jaw action is effected through vertical relay K3 and horizontal relay K4. In the case of the "forward" close and forward "open" program, ground connection for the respective K5 coils is completed through the normally closed contacts 1 and 2 on K4 (horizontal relay not energized), the normally open contacts 2 and 3 on K3 and through jaw action switch S3. Thus it will be seen that the jaws can only be actuated when the vertical carriage is in the "down" position and K3 is actuated. A delay period of about 15 milliseconds between actuation of the vertical switch 76 and actuation of the jaw solenoid is introduced by the charge time of C4, CR3 and R7 in conjunction with relay coil K3. This permits the jaws to reach a stable rest position before they are actuated. When S3 is set to "immediate" position, the jaws are closed as soon as the vertical relay is closed by the actuation of switch 76; when S3 is set to "inhibit," closing of the jaws is delayed until the clutch is closed (i.e., jaw departure time).

In the case of the rear jaw "close" and rear jaw "open" program, ground connections for the respective K5 coils are completed through the normally closed contacts 2 and 3 on K4, and through K3 and S3 as described above. K3 is closed as required for the rear or "in" position by the closing of 82.

It will be apparent from the foregoing description that the grasping jaws may be either internally programmed to "open" at the "in" position and close at the "out" position or close at the "in" position and open at the "out" position in accordance with the operating requirements of a given assembly operation. As described above, the jaw programming may also be controlled by external machines to coordinate the jaw grasping or releasing functions of the manipulator with the operations of those machines.

While the continuous or "repeat cycle" operation may be advantageously used in many manipulator applications, in other applications the user may find it necessary to periodically stop the manipulator operation for the duration of an assembly operation or the like. The operating cycle may be stopped at either the "forward" position or the "rear" position by setting switch S10 or S11 to "stop." The operating cycle may then be restarted at the desired time from the stopped forward position or rear position by the actuation of an externally controlled grounding switch connected to TB5 terminal 3, or TB5 terminal 4 as indicated (dotted). Thus with S4 set to "run," S10 set to "stop" and S11 set to "cycle," the manipulator will complete one cycle of operation and stop at the "rear" or "in" position, and with S10 set to "cycle" and S11 set to "stop," the manipulator will complete one cycle of operation and stop in the "out" or forward position.

Half cycle operation of the manipulator may be achieved by setting S4 to "run" and S10 and S11 to "stop." Successive half cycle operations are then achieved by successive closings of the externally operated switches connected to terminals 3 and 4 of TB5.

As indicated above, the manipulator provided by the present invention is adapted to either control or be controlled by cooperating machines. This operating feature permits great flexibility of system design. Thus a combination of cooperating machines (including one or more manipulators) may be interconnected to form an open-loop control system whereby the sequence of motions performed by each machine is perfectly coordinated in time sequence with those of the neighboring machines. In the particular circuit diagram shown in FIG. 19, control signals or switching operations for control of external machines may be obtained corresponding to several different time intervals in the operating cycle. Terminal 11 of TB4 provides an output signal (A.-C. ground) when the vertical carriage is "in" and "down" while terminal 13 of TB5 provides an output signal when the vertical carriage is "down" and "out."

An output pulse signal is provided during rearward horizontal travel at terminal 10 of TB5 and the stall timer may be used if desired by connecting TB5-5 with TB5-6. An output control pulse may be obtained during forward horizontal travel by connecting the external device to TB5-6. If the stall timer is to be used, TB5-9 is then connected to TB5-10.

While the invention has been particularly shown and described with reference to a preferred embodiment thereof, it will be understood by those skilled in the art that various changes in form and details may be made therein without departing from the spirit and scope of the invention.

What we claim is:

1. Automatic article manipulator apparatus comprising a support base, a carriage arm mounted on said base, said arm being disposed for and movable oppositely in horizontal translation with respect to said base to an extended "out" position and to a retracted "in" position, an elevator carriage mounted on said carriage arm, said carriage being disposed for and movable oppositely in vertical translation with respect to said arm to an "up" position and to a "down" position, article grasping jaws mounted on said vertical elevator carriage, said jaws being adapted to be actuated to an "open" release position and to a "closed" pick-up position, a first yieldable drive means coupled to said horizontally disposed carriage arm for moving said carriage arm from the retracted "in" position to the extended "out" position, a second drive means for elevating said vertical carriage from said "down" position to said "up" position and for moving said horizontal carriage from said extended "out" position to said retracted "in" position, a coupling clutch adapted to connect said second drive means to said carriage arm and to said elevator carriage, latching means adapted to lock said carriage arm at said "in" position and said "out" position, means responsive to movement of said elevator carriage from the "down" position to the "up" position to lock said elevator carriage thereat and unlock said carriage arm, means responsive to movement of said carriage arm to said "in" position or said "out" position to lock said carriage arm thereat and unlock said elevator carriage, electromechanical control means adapted to operatively engage said coupling clutch when said elevator carriage is moved to the "down" position, a first cam means adapted to disengage said coupling clutch when the carriage arm is retracted to the "in" position, and a second cam means adapted to disengage said coupling clutch when the carriage arm is in the locked "in" position and the elevator carriage is moved to the locked "up" position.

2. Automatic article manipulator apparatus comprising a support base, a carriage arm mounted on said base, said arm being disposed for and movable oppositely in horizontal translation with respect to said base to an extended "out" position and to a retracted "in" position, an elevator carriage mounted on said carriage arm, said carriage being disposed for and movable oppositely in vertical translation with respect to said arm to an "up" position and to a "down" position, article grasping jaws mounted on said vertical elevator carriage, said jaws being adapted to be actuated to an "open" release position and to a "closed" pick-up position, a first yieldable drive means coupled to said horizontally disposed carriage arm for moving said carriage arm from the retracted "in" position to the extended "out" position, a second drive means for elevating said vertical carriage from said "down" position to said "up" position and for moving said horizontal carriage from said extended "out" position to said retracted "in" position, a coupling clutch adapted to connect said second drive means to said carriage arm and to said elevator carriage, latching means adapted to lock said carriage arm at said "in" position and said "out" position, means responsive to movement of said elevator carriage from the "down" position to the "up" position to lock said elevator carriage thereat and unlock said carriage arm, means responsive to movement of said carriage arm to said "in" position or said "out" position to lock said carriage arm thereat and unlock said elevator carriage, electromechanical control means adapted to operatively engage said coupling clutch when said elevator carriage is moved to the "down" position, a first cam means adapted to disengage said coupling clutch when the carriage arm is retracted to the "in" position, a second cam means adapted to disengage said coupling clutch when the carriage arm is in the locked "in" position and the elevator carriage is moved to the locked "up" position, first switch means operable by said carriage arm to produce a first output control signal at a predetermined position of said arm, and second switch means operable by said elevator carriage to produce a second output control signal at a predetermined position of said elevator carriage.

3. Automatic article manipulator apparatus comprising a support base, a carriage arm mounted on said base, said arm being disposed for and movable oppositely in horizontal translation with respect to said base to an extended "out" position and to a retracted "in" position, an elevator carriage mounted on said carriage arm, said carriage being disposed for and movable oppositely in vertical translation with respect to said arm to an "up" position and to a "down" position, article grasping jaws mounted on said vertical elevator carriage, said jaws being adapted to be actuated to an "open" release position and to a "closed" pick-up position, a first yieldable drive means coupled to said horizontally disposed carriage arm for moving said carriage arm from the retracted "in" position to the extended "out" position, a second drive means for elevating said vertical carriage from said "down" position to said "up" position and for moving said horizontal carriage from said extended "out" position to said retracted "in" position, a coupling clutch adapted to connect said second drive means to said carriage arm and to said elevator carriage, latching means adapted to lock said carriage arm at said "in" position and said "out" position, means responsive to movement of said elevator carriage from the "down" position to the "up" position to lock said elevator carriage thereat and unlock said carriage arm, means responsive to movement of said carriage arm to said "in" position or said "out" position to lock said carriage arm thereat and unlock said elevator carriage, electromechanical control means adapted to operatively engage said coupling clutch when said elevator carriage is moved to the "down" position, a first cam means adapted to disengage said coupling clutch when the carriage arm is retracted to the "in" position, a second cam means adapted to disengage said coupling clutch when the carriage arm is in the locked "in" position and the elevator carriage is moved to the locked "up" position, adjustable stop means slidably attached to said carriage arm and operably arranged to define a variable "down" position for said elevator carriage, and cam means provided to vary the position of said stop as a function of carriage arm position.

4. Automatic article manipulator apparatus comprising a support base, a carriage arm mounted on said base, said arm being disposed for and movable oppositely in horizontal translation with respect to said base to an extended "out" position and to a retracted "in" position, an elevator carriage mounted on said carriage arm, said carriage being disposed for and movable oppositely in vertical translation with respect to said arm to an "up" position and to a "down" position, article grasping jaws mounted on said vertical elevator carriage, said jaws being adapted to be actuated to an "open" release position and to a "closed" pick-up position, a first yieldable drive means coupled to said horizontally disposed carriage arm for moving said carriage arm from the retracted "in" position to the extended "out" position, a second drive means for elevating said vertical carriage from said "down" position to said "up" position and for moving said horizontal carriage from said extended "out" position to said retracted "in" position, a coupling clutch adapted to connect said second drive means to said carriage arm and to said elevator carriage, latching means adapted to lock said carriage arm at said "in" position and said "out" position, means responsive to movement of said elevator carriage from the "down" position to the "up" position to lock said elevator carriage thereat and unlock said carriage arm, means responsive to movement of said carriage arm to said "in" position or said "out" position to lock said carriage arm thereat and unlock said elevator carriage, electromechanical control means adapted to operatively engage said coupling clutch when said elevator carriage is moved to the "down" position, a first cam means adapted to disengage said coupling clutch when the carriage arm is retracted to the "in" position, a second cam means adapted to disengage said coupling clutch when the carriage arm is in the locked "in" position and the elevator carriage is moved to the locked "up" position, and electromechanical means operable in response to movements of said vertical and horizontal carriages to alternately open and close said jaws.

5. Automatic article manipulator apparatus comprising a support base, a carriage arm mounted on said base, said arm being disposed for and movable oppositely in horizontal translation with respect to said base to an extended "out" position and to a retracted "in" position, an elevator carriage mounted on said carriage arm, said carriage being disposed for and movable oppositely in vertical translation with respect to said arm to an "up" position and to a "down" position, article grasping jaws mounted on said vertical elevator carriage, said jaws being adapted to be actuated to an "open" release position and to a "closed" pick-up position, a first yieldable drive means coupled to said horizontally disposed carriage arm for moving said carriage arm from the retracted "in" position to the extended "out" position, a second drive means for elevating said vertical carriage from said "down" position to said "up" position and for moving said horizontal carriage from said extended "out" position to said retracted "in" position, a coupling clutch adapted to connect said second drive means to said carriage arm and to said elevator carriage, latching means adapted to lock said carriage arm at said "in" position and said "out" position, means responsive to movement of said elevator carriage from the "down" position to the "up" position to lock said elevator carriage thereat and unlock said carriage arm, means responsive to movement of said carriage arm to said "in" position or said "out" position to lock said carriage arm thereat and unlock said elevator carriage, electromechanical control means adapted to operatively engage said coupling clutch when said elevator carriage is moved to the "down" position, a first cam means adapted to disengage said coupling clutch when the carriage arm is retracted to the "in" position, a second cam means adapted to disengage said coupling clutch when the carriage arm is in the locked "in" position and the elevator carriage is moved to the locked "up" position, adjustable stop means slidably attached to said carriage arm and operably arranged to define a variable "down" position for said elevator carriage, cam means provided to vary the position of said stop as a function of carriage arm position, and electromechanical means operable in response to movements of said vertical and horizontal carriages to alternately open and close said jaws.

6. Automatic article manipulator apparatus comprising a support base, a carriage arm mounted on said base, said arm being disposed for and movable oppositely in horizontal translation with respect to said base to an extended "out" position and to a retracted "in" position, an elevator carriage mounted on said carriage arm, said carriage being disposed for and movable oppositely in vertical translation with respect to said arm to an "up" position and to a "down" position, article grasping jaws mounted on said vertical elevator carriage, said jaws being adapted to be actuated to an "open" release position and to a "closed" pick-up position, a first yieldable drive means coupled to said horizontally disposed carriage arm for moving said carriage arm from the retracted "in" position to the extended "out" position, a second drive means for elevating said vertical carriage from said "down" position to said "up" position and for moving said horizontal carriage from said extended "out" position to said retracted "in" position, a coupling clutch adapted to connect said second drive means to said carriage arm and to said elevator carriage, latching means adapted to lock said carriage arm at said "in" position and said "out" position, means responsive to movement of said elevator carriage from the "down" position to the "up" position to lock said elevator carriage thereat and unlock said carriage arm, means responsive to movement of said carriage arm to said "in" position or said "out" position to lock said carriage arm thereat and unlock said elevator carriage, electromechanical control means adapted to operatively engage said coupling clutch when said elevator carriage is moved to the "down" position, a first cam means adapted to disengage said coupling clutch when the carriage arm is retracted to the "in" position, a second cam means adapted to disengage said coupling clutch when the carriage arm is in the locked "in" position and the elevator carriage is moved to the locked "up" position, and stop means mounted on said base, said stop means being adjustable to independently define the respective "in" and "out" positions for said carriage arm.

7. Automatic article manipulator apparatus comprising a support base, a carriage arm mounted on said base, said arm being disposed for and movable oppositely in horizontal translation with respect to said base to an extended "out" position and to a retracted "in" position, an elevator carriage mounted on said carriage arm, said carriage being disposed for and movable oppositely in vertical translation with respect to said arm to an "up" position and to a "down" position, article grasping jaws mounted on said vertical elevator carriage, said jaws being adapted to be actuated to an "open" release position and to a "closed" pick-up position, a first yieldable drive means coupled to said horizontally disposed carriage arm for moving said carriage arm from the retracted "in" position to the extended "out" position, a second drive means for elevating said vertical carriage from said "down" position to said "up" position and for moving said horizontal carriage from said extended "out" position to said retracted "in" position, a coupling clutch adapted to connect said second drive means to said carriage arm and to said elevator carriage, latching means adapted to lock said carriage arm at said "in" position and said "out" position, means responsive to movement of said elevator carriage from the "down" position to the "up" position to lock said elevator carriage thereat and unlock said carriage arm, means responsive to movement of said carriage arm to said "in" position or said "out" position to lock said carriage arm thereat and unlock said elevator carriage, electromechanical control means adapted to operatively engage said coupling clutch when said elevator carriage is moved to the "down" position, a first cam means adapted to disengage said coupling clutch when the carriage arm is retracted to the "in" position, a second cam means adapted to disengage said coupling clutch when the carriage arm is in the locked "in" position and the elevator carriage is moved to the locked "up" position, stop means mounted on said base, said stop means being adjustable to independently define the respective "in" and "out" positions for said carriage arm, first switch means operable by said carriage arm to produce a first output control signal at a predetermined position of said arm, and second switch means operable by said elevator carriage to produce a second output control signal at a predetermined position of said elevator carriage.

8. Automatic article manipulator apparatus in accordance with claim 1 wherein said first drive means comprises a spring motor operatively coupled to said carriage arm by a flexible draw-tape, and said clutch is operatively coupled to said carriage arm and said elevator carriage by a flexible draw-tape.

9. Automatic article manipulator apparatus in accordance with claim 3 wherein said first drive means comprises a spring motor operatively coupled ot said carriage arm by a flexible draw-tape, and said clutch is operatively coupled to said carriage arm and said elevator carriage by a flexible draw-tape.

10. Automatic article manipulator apparatus comprising a support base, a carriage arm mounted on said base, said arm being disposed for and movable oppositely in horizontal translation with respect to said base to an extended "out" position and to a retracted "in" position, an elevator carriage mounted on said carriage arm, said carriage being disposed for and movable oppositely in vertical translation with respect to said arm to an "up" position and to a "down" position, article grasping jaws mounted on said vertical elevator carriage, said jaws being adapted to be actuated to an "open" release position and to a "closed" pick-up position, a first yieldable drive means coupled to said horizontally disposed carriage arm for moving said carriage arm from the retracted "in" position to the extended "out" position, a second drive means for elevating said vertical carriage from said "down" position to said "up" position and for moving said horizontal carriage from said extended "out" position to said retracted "in" position, a coupling clutch adapted to connect said second drive means to said carriage arm and to said elevator carriage, latching means adapted to lock said carriage arm at said "in" position and said "out" position, means responsive to movement of said elevator carriage from the "down" position to the "up" position to lock said elevator carriage thereat and unlock said carriage arm, means responsive to movement of said carriage arm to said "in" position or said "out" position to lock said carriage arm thereat and unlock said elevator carriage, electromechanical control means adapted to operatively engage said coupling clutch when said elevator carriage is moved to the "down" position, a first cam means adapted to disengage said coupling clutch when the carriage arm is retracted to the "in" position, a second cam means adapted to disengage said coupling clutch when the carriage arm is in the locked "in" position and the elevator carriage is moved to the locked "up" position, adjustable stop means slidably attached to said carriage arm and operably arranged to define a variable "down" position for said elevator carriage, cam means provided to vary the position of said stop as a function of carriage arm position, first switch means operable by said carriage arm to produce a first output control signal at a predetermined position of said arm, and second switch means operable by said elevator carriage to produce a second output control signal at a predetermined position of said elevator carriage.

11. Automatic article manipulator apparatus comprising a support base, a carriage arm mounted on said base, said arm being disposed for and movable oppositely in horizontal translation with respect to said base to an extended "out" position and to a retracted "in" position, elevator carriage mounted on said carriage arm, said carriage being disposed for and movable oppositely in vertical translation with respect to said arm to an "up" position and to a "down" position, article grasping jaws mounted on said vertical elevator carriage, said jaws being adapted to be actuated to an "open" release position and to a "closed" pick-up position, a first yieldable drive means coupled to said horizontally disposed carriage arm for moving said carriage arm from the retracted "in" position to the extended "out" position, a second drive means for elevating said vertical carriage from said "down" position to said "up" position and for moving said horizontal carriage from said extended "out" position to said retracted "in" position, a coupling clutch adapted to connect said second drive means to said carriage arm and to said elevator carriage, latching means adapted to lock said carriage arm at said "in" position and said "out" position, means responsive to movement of said elevator carriage from the "down" position to the "up" position to lock said elevator carriage thereat and unlock said carriage arm, means responsive to movement of said carriage arm to said "in" position or said "out" position to lock said carriage arm thereat and unlock said elevator carriage, electromechanical control means adapted to operatively engage said coupling clutch when said elevator carriage is moved to the "down" position, a first cam means adapted to disengage said coupling clutch when the carriage arm is retracted to the "in" position, a second cam means adapted to disengage said coupling clutch when the carriage arm is in the locked "in" position and the elevator carriage is moved to the locked "up" position, adjustable stop means slidably attached to said carriage arm and operably arranged to define a variable "down" position for said elevator carriage, cam means provided to vary the position of said stop as a function of carriage arm position, and stop means mounted on said base, said stop means being adjustable to independently define the respective "in" and "out" positions for said carriage arm.

References Cited in the file of this patent
UNITED STATES PATENTS

| | | |
|---|---|---|
| 1,575,185 | Stenhouse | Mar. 2, 1926 |
| 1,903,916 | Stenhouse et al. | Apr. 18, 1933 |
| 2,959,301 | Willsea | Nov. 8, 1960 |
| 3,001,651 | Fekete et al. | Sept. 26, 1961 |
| 3,007,097 | Shelley et al. | Oct. 31, 1961 |